United States Patent
Kuo (10) Patent No.: US 10,142,002 B2
(45) Date of Patent: Nov. 27, 2018

(54) METHOD OF HANDLING MULTIUSER CQI FOR MU-MIMO AND RELATED COMMUNICATION DEVICE

(71) Applicant: Industrial Technology Research Institute, Hsinchu (TW)

(72) Inventor: Ping-Heng Kuo, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 150 days.

(21) Appl. No.: 14/140,558

(22) Filed: Dec. 26, 2013

(65) Prior Publication Data

US 2014/0185478 A1  Jul. 3, 2014

Related U.S. Application Data

(60) Provisional application No. 61/840,479, filed on Jun. 28, 2013, provisional application No. 61/746,566, filed on Dec. 28, 2012.

(51) Int. Cl.
| | |
|---|---|
| H04B 7/06 | (2006.01) |
| H04B 7/0452 | (2017.01) |
| H04L 5/00 | (2006.01) |
| H04B 7/0456 | (2017.01) |

(52) U.S. Cl.
CPC ......... *H04B 7/0626* (2013.01); *H04B 7/0452* (2013.01); *H04B 7/065* (2013.01); *H04B 7/0632* (2013.01); *H04B 7/0639* (2013.01); *H04L 5/0057* (2013.01); *H04B 7/0456* (2013.01); *H04B 7/0617* (2013.01)

(58) Field of Classification Search
CPC .... H04B 7/0626; H04B 7/0452; H04L 5/0057
See application file for complete search history.

(56) References Cited

U.S. PATENT DOCUMENTS

| | | |
|---|---|---|
| 2010/0131813 A1 | 5/2010 | Kim |
| 2011/0200131 A1 | 8/2011 | Gao |
| 2012/0076028 A1 | 3/2012 | Ko |
| 2012/0220286 A1 | 8/2012 | Chen |
| 2012/0231742 A1* | 9/2012 | Barberis et al. ............. 455/63.1 |

FOREIGN PATENT DOCUMENTS

| | | |
|---|---|---|
| CN | 102377530 A | 3/2012 |
| EP | 2 624 473 A2 | 8/2013 |
| KR | 1020120033283 A | 4/2012 |
| WO | 2010121385 A1 | 10/2010 |

OTHER PUBLICATIONS

Harri Holma et al., LTE for UMTS—OFDMA and SC-FDMA Based Radio Access, Physical Layer, Channel Feedback Report Types in LTE, XP055342643, Jun. 2, 2009, p. 125, John Wiley & Sons.

* cited by examiner

*Primary Examiner* — Kent K Krueger
(74) *Attorney, Agent, or Firm* — Winston Hsu (57) ABSTRACT

A method of handling multiuser channel quality indicators (MU-CQIs) for a communication device comprises transmitting a highest MU-CQI periodically to a network; and transmitting at least one MU-CQI aperiodically to the network according to a request transmitted by the network.

8 Claims, 6 Drawing Sheets

METHOD OF HANDLING MULTIUSER CQI FOR MU-MIMO AND RELATED COMMUNICATION DEVICE

CROSS REFERENCE TO RELATED APPLICATIONS

This application claims both the benefit of U.S. Provisional Application No. 61/746,566, filed on Dec. 28, 2012, entitled "Feedback Triggering Methods for Wireless Communication Systems", and the benefit of U.S. Provisional Application No. 61/840,479, filed on Jun. 28, 2013, entitled "Feedback Triggering Methods for Wireless Communication Systems", the contents of which are incorporated herein in their entirety.

BACKGROUND OF THE INVENTION

1. Field of the Invention

The present invention relates to a method used in a wireless communication system and related communication device, and more particularly, to a method of handling one or more multiuser channel quality indicators (MU-CQIs) for multiuser multiple-input multiple-output (MU-MIMO) and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In addition, multiuser multiple-input multiple-output (MU-MIMO) is currently discussed in the 3GPP. In detail, multiple transmit antennas are installed at the eNB, such that the eNB can operate the MU-MIMO by using the transmit antennas according to one or more precoding matrices. For example, the eNB may need accurate channel state information (CSI) to select a precoding matrix properly for one or more transmissions. In another example, a UE may feed back a channel quality indicator (CQI) and a preferred precoding matrix to the eNB, such that the eNB can select the precoding matrix according to the CQI and the preferred precoding matrix. Then, the eNB performs transmissions to multiple UEs via the same resource (e.g., the same subband (s) and/or the same time period (s)) by operating the MU-MIMO according to the precoding matrix. Thus, performance (e.g., throughputs) of the eNB and the UE is improved due to efficient usage of the resource.

However, methods of feeding back the CQI proposed for single user-MIMO (SU-MIMO) may not be suitable for the MU-MIMO, and methods of feeding back the CQI proposed for the MU-MIMO is still unknown. The eNB may not operate the MU-MIMO properly with the CQI fed back according to the SU-MIMO, and the performance of the eNB and the UE can not be improved greatly. Thus, feeding back the CQI for the MU-MIMO is a problem to be solved.

SUMMARY OF THE INVENTION

The present invention therefore provides a method and related communication device for handling one or more multiuser channel quality indicators (MU-CQIs) for multiuser multiple-input multiple-output (MU-MIMO) to solve the abovementioned problem.

A method of handling multiuser channel quality indicators (MU-CQIs) for a communication device comprises transmitting a highest MU-CQI periodically to a network; and transmitting at least one MU-CQI aperiodically to the network according to a request transmitted by the network.

A method of handling at least one multiuser channel quality indicator (MU-CQI) set for a communication device comprises receiving information of at least one companion precoding matrix index (PMI) set transmitted by the network; determining at least one MU-CQI set according to the at least one companion PMI set, respectively, wherein each MU-CQI of each MU-CQI set of the at least one MU-CQI set is determined according to a corresponding companion PMI of a corresponding companion PMI set of the at least one companion PMI set; and transmitting the at least one MU-CQI set to the network.

A method of handling multiuser channel quality indicators (MU-CQIs) for a communication device comprises determining a first MU-CQI according to a first companion PMI; determining a second MU-CQI according to a second companion PMI; dropping the first MU-CQI, when the first MU-CQI collides with the second MU-CQI; and transmitting the second MU-CQI to a network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
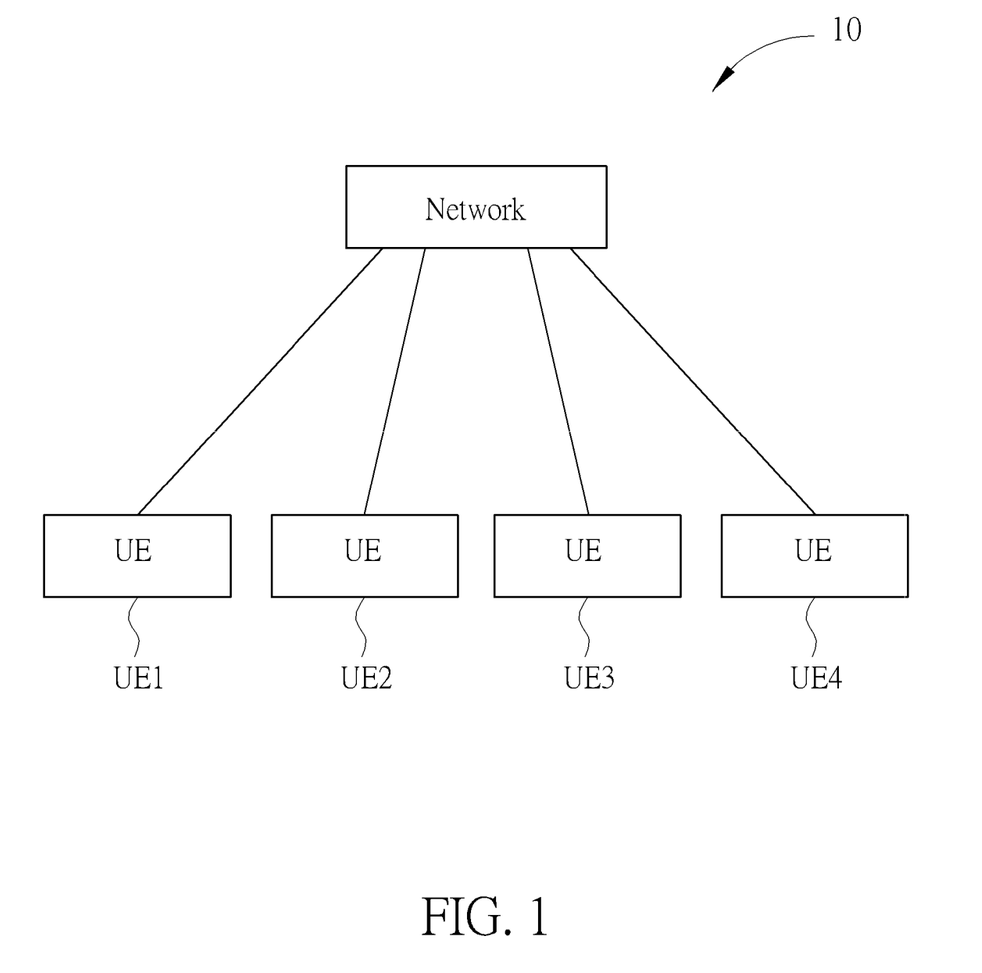
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of user equipments (UEs) UE1-UE3. In FIG. 1, the network and the UEs UE1-UE3 are simply utilized for illustrating the structure of the wireless communication system 10. Practically, the network can be a universal terrestrial radio access network (UTRAN) comprising one or more Node-Bs (NBs) in a universal mobile telecommunications system (UMTS). In another example, the network can be an evolved UTRAN (E-UTRAN) comprising one or more evolved NBs (eNBs) and/or one or more relays in a long term evolution (LTE) system, a LTE-Advanced (LTE-A) system or an evolution of the LTE-A system. In addition, only three UEs are considered in the wireless communication system 10. However, this is not a limitation to the present invention. Practically, the network usually communicates with more than three UEs.

The network equips with multiple transmit antennas, to operate multiuser multiple-input multiple-output (MU-MIMO) by using the transmit antennas according to one or more precoding matrices. For example, the network may perform transmissions to the UEs UE1-UE2 via the same resource (e.g., the same subband(s) and/or the same time period(s)) by operating the MU-MIMO, e.g., after the UEs UE1-UE2 are "paired". In this situation, the UE1 is a companion UE of the UE2, and the UE2 is a companion UE of the UE1. In another example, the network may perform transmissions to the UEs UE1-UE3 via the same resource (e.g., the same subband(s) and/or the same time period(s)) by operating the MU-MIMO, e.g., after the UEs UE1-UE3 are "paired". In this situation, the UEs UE2-UE3 are companion UEs of the UE UE1, the UEs UE1-UE2 are companion UEs of the UE UE3, and the UE UE1 and the UE UE3 are companion UEs of the UE UE2.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A UE can be a mobile phone, a laptop, a tablet computer, an electronic book or a portable computer system. Besides, the network and the UE can be seen as a transmitter or a receiver according to direction, e.g., for an uplink (UL), the UE is the transmitter and the network is the receiver, and for a downlink (DL), the network is the transmitter and the UE is the receiver.

Figure 2:
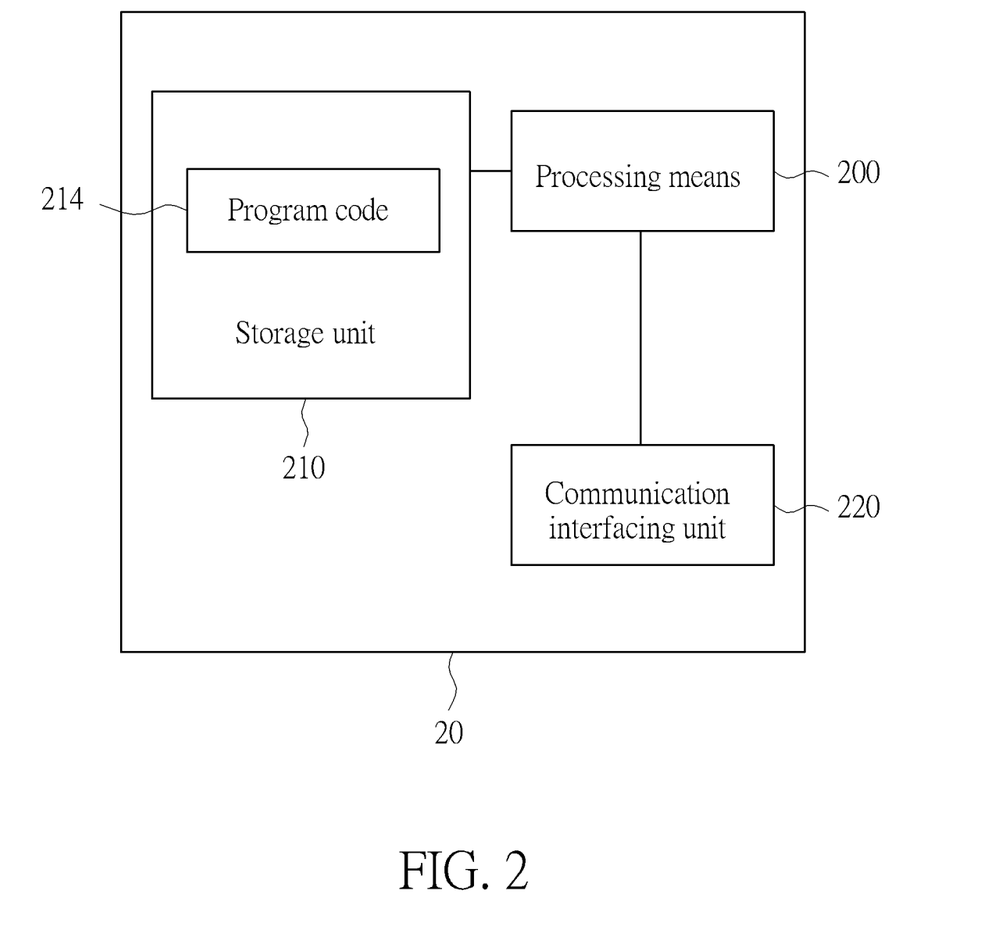
FIG. 2 is a schematic diagram of a communication device according to an example of the present invention.

Please refer to FIG. 2, which is a schematic diagram of a communication device 20 according to an example of the present invention. The communication device 20 can be a UE or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
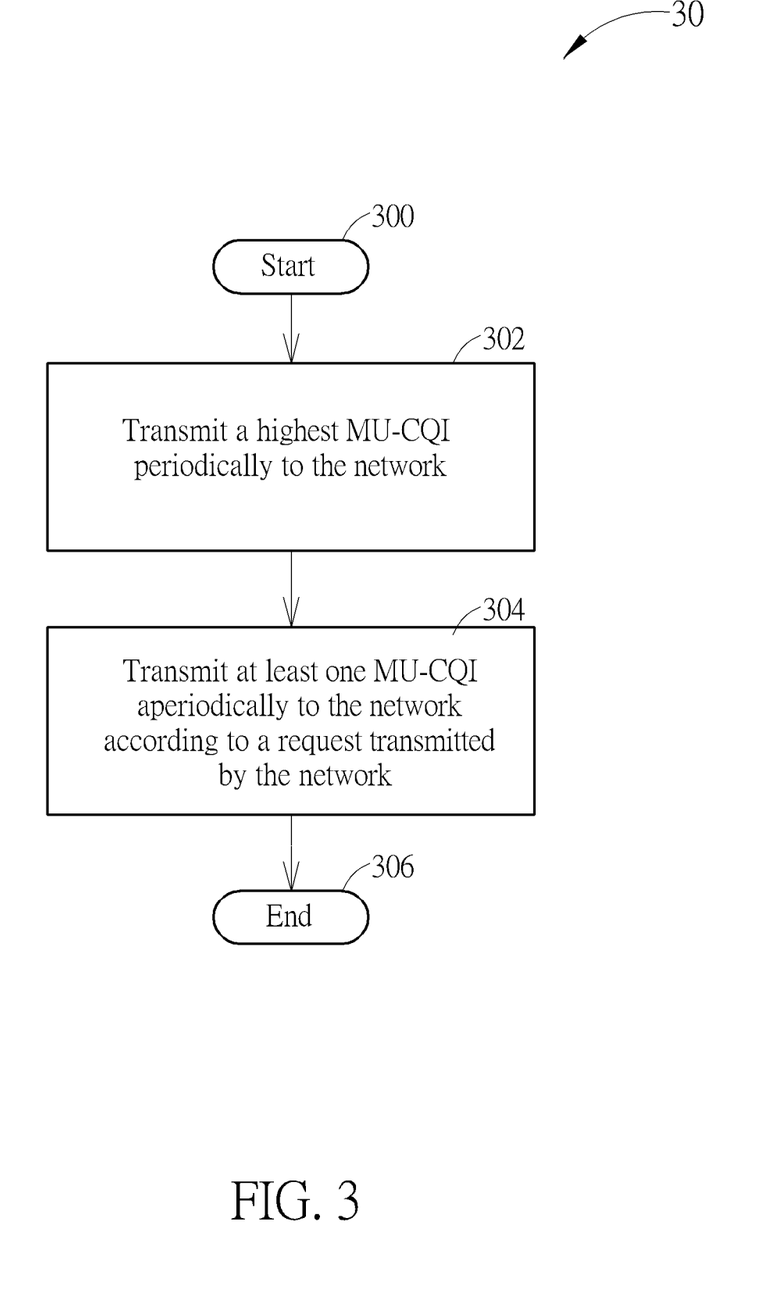
FIG. 3 is a flowchart of a process according to an example of the present invention.

Please refer to FIG. 3, which is a flowchart of a process 30 according to an example of the present invention. The process 30 can be utilized in a UE shown in FIG. 1, for handling multiuser channel quality indicators (MU-CQIs). The process 30 may be compiled into the program code 214 and includes the following steps:

Step 300: Start.

Step 302: Transmit a highest MU-CQI periodically to the network.

Step 304: Transmit at least one MU-CQI aperiodically to the network according to a request transmitted by the network.

Step 306: End.

According to the process 30, the UE transmits a highest MU-CQI periodically (e.g., with a specific period) to the network, and transmits at least one MU-CQI aperiodically to the network according to a request transmitted by the network. For example, the UE may determine the highest MU-CQI based on that least interference is caused to the UE when the network performs a DL transmission to a companion UE of the UE according a precoding matrix index (PMI) corresponding to the highest MU-CQI. In addition, the request may include information of at least one PMI such that the UE can determine (e.g., estimate) the at least one MU-CQI corresponding to the at least one PMI. Thus, the network can operate the MU-MIMO according to all or part of the highest MU-CQI and/or the at least one MU-CQI (and maybe also other information). Thus, performance (e.g., throughput) of the network and the UE is improved greatly, when the network operate the MU-MIMO according to the MU-CQI (s) reported by the UE. As a result, performance (e.g., capacity) of the wireless communication system 10 is improved.

Realization of the process 30 is not limited to the above description. For example, the process 30 can be realized before the network performs a transmission to the UE by operating the MU-MIMO. The transmission may be an initial transmission or one of successive transmissions, and is not limited. That is, the UE may estimate the highest MU-CQI and/or the at least one MU-CQI in the process 30 according to corresponding companion PMI (s), to improve the transmission performed by the network. In this situation, the companion UE should be treated as a virtual UE for estimating the highest MU-CQI and/or the at least one MU-CQI. In addition, a UE may transmit the highest MU-CQI periodically via a physical uplink control channel (PUCCH) to the network. In addition, a UE may transmit the at least one MU-CQI to the network aperiodically via a physical uplink shared channel (PUSCH). For example, the UE may transmit the highest MU-CQI in subframes 0, 2, 4 and 6 (i.e., the period is 2) to the network.

According to the above description and the process 30, performance (e.g., throughput) of the network and the UE is improved greatly, when the network operate the MU-MIMO according to the MU-CQI (s) reported by the UE. As a result, performance (e.g., capacity) of the wireless communication system 10 is improved.

Figure 4:
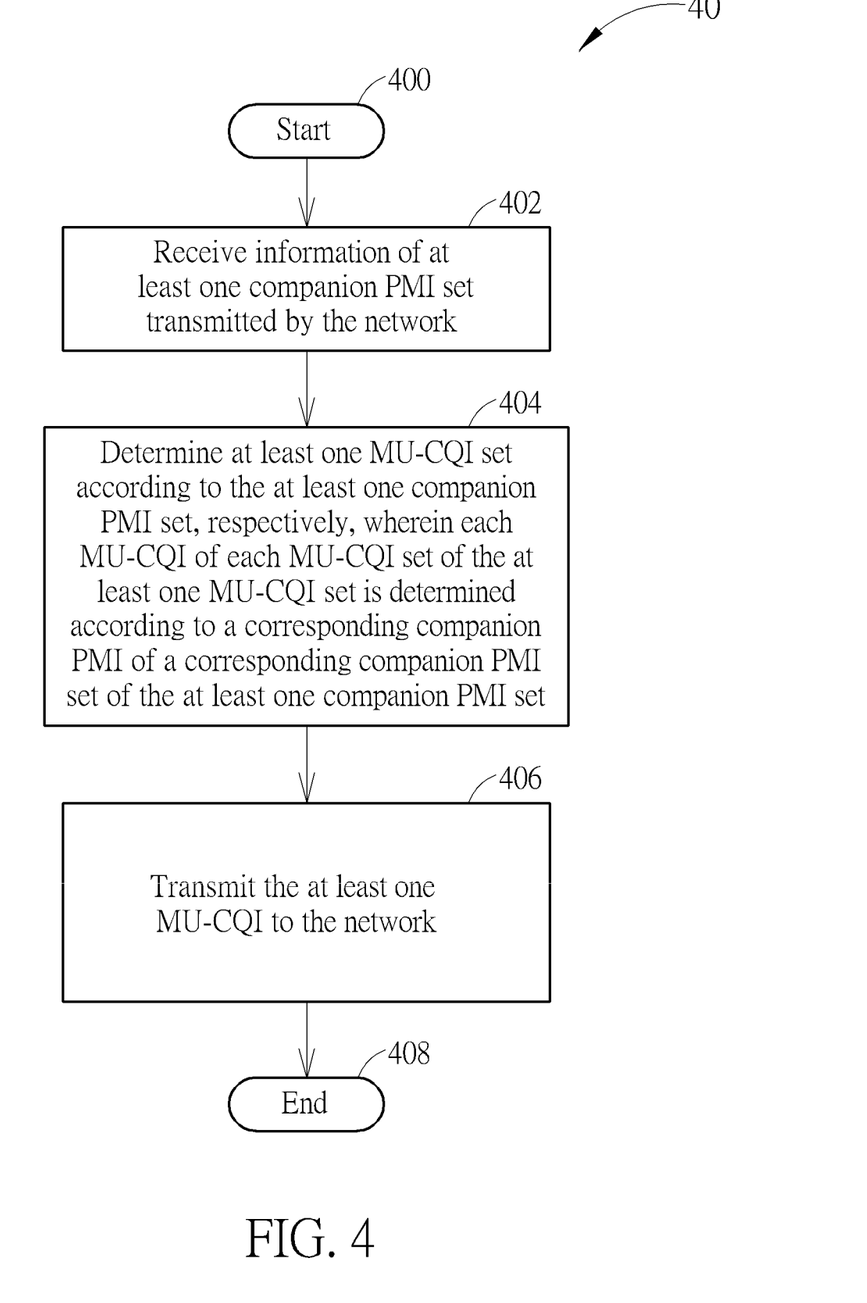
FIG. 4 is a flowchart of a process according to an example of the present invention.

Please refer to FIG. 4, which is a flowchart of a process 40 according to an example of the present invention. The process 40 can be utilized in a UE shown in FIG. 1, for handling at least one MU-CQI set. The process 40 may be compiled into the program code 214 and includes the following steps:

Step 400: Start.

Step 402: Receive information of at least one companion PMI set transmitted by the network.

Step 404: Determine at least one MU-CQI set according to the at least one companion PMI set, respectively, wherein each MU-CQI of each MU-CQI set of the at least one MU-CQI set is determined according to a corresponding companion PMI of a corresponding companion PMI set of the at least one companion PMI set.

Step 406: Transmit the at least one MU-CQI set to the network.

Step 408: End.

According to the process 40, the UE receives information of at least one companion PMI set (e.g., aperiodically) transmitted by the network. Further, the UE determines (e.g., derives or estimates) at least one MU-CQI set according to the at least one companion PMI set, respectively, wherein each MU-CQI of each MU-CQI set of the at least one MU-CQI set is determined according to a corresponding companion PMI of a corresponding companion PMI set of the at least one companion PMI set. Then, the UE transmits the at least one MU-CQI set to the network. Thus, the network can operate the MU-MIMO according to all or part of the at least one MU-CQI set (and maybe also other information), after receiving the at least one MU-CQI set. In other words, the at least one companion PMI set may be indicated (e.g., aperiodically) by the network, such that the UE can determine the at least one MU-CQI set according to the at least one companion PMI set. Thus, performance (e.g., throughput) of the network and the UE is improved greatly, when the network operate the MU-MIMO according to the MU-CQI(s) reported by the UE. As a result, performance (e.g., capacity) of the wireless communication system 10 is improved.

Figure 5:
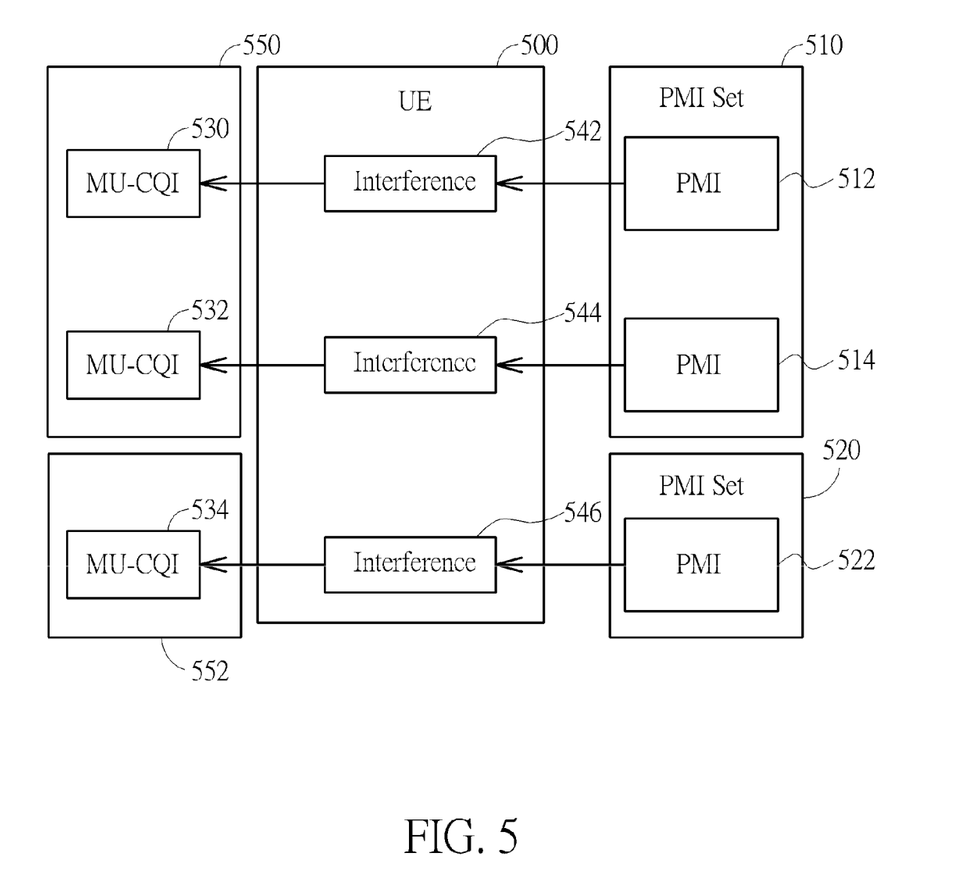
FIG. 5 is a schematic diagram of determination of MU-CQIS according an example of the present invention.

Please refer to FIG. 5, which is a schematic diagram of determination of MU-CQIs according an example of the present invention. FIG. 5 is used for illustrating an example of the process 40. As shown in FIG. 5, a UE 500 receives information of PMI sets 510 and 520, wherein the PMI set 510 includes PMIS 512 and 514 and the PMI set 520 includes a PMI 522. The UE 500 determines (e.g., derives or estimates) a MU-CQI 530 according to interference 542 caused by a DL transmission performed by the network using the PMI 512 to the companion UE, and determines (e.g., derives or estimates) a MU-CQI 532 according to interference 544 caused by another DL transmission performed by the network using the PMI 514 to the companion UE. In addition, the UE 500 determines (e.g., derives or estimates) a MU-CQI 534 according to interference 546 caused by another DL transmission performed by the network using the PMI 522 to the companion UE. Then, the UE 500 transmits a MU-CQI set 550 including the MU-CQIs 530 and 532 and a MU-CQI set 552 including the MU-CQI 534 to the network.

Realization of the process 40 is not limited to the above description. For example, a UE may transmit at least one MU-CQI set via a UL control channel, e.g., physical UL shared channel (PUSCH), to the network. In addition, the UE may transmit at least one MU-CQI set to the network by transmitting one of the at least one MU-CQI set and difference between the one of the at least one MU-CQI set and the rest of the at least one MU-CQI set to the network. In other words, the one of the at least one MU-CQI set is treated as a reference MU-CQI set. The network can determine (e.g., recover) the at least one MU-CQI set according to the reference MU-CQI set and the difference between the reference MU-CQI set and the rest of the at least one MU-CQI set. Overhead for transmitting the at least one MU-CQI set is saved, since the UE simply transmits the reference MU-CQI set and the difference to the network instead of transmitting the at least one MU-CQI set completely. In another example, the UE may simply transmit the at least one MU-CQI set completely to the network without taking into consideration the overhead. In addition, the UE may not need to transmit at least one MU-CQI set to the network immediately, but may transmit the at least one MU-CQI set in at least one time period (e.g., subframe(s) and/or frame(s)) indicated by the network to the network.

On the other hand, detail of information of at least one PMI set received from the network is not limited. For example, the UE may receive a plurality of PMI sets via a higher layer signaling (e.g., radio resource control (RRC) signaling) transmitted by the network first. Then, the UE selects the at least one PMI set from the plurality of PMI sets according to the information. That is, the network does not need to transmit the at least one PMI set to the UE completely, but only needs to transmit the information capable of indicating the at least one PMI set from the plurality of PMI sets to the UE. For example, the information may include at least one bit indicating the at least one PMI set. As an example, 3 PMI sets PSet1-PSet3 are considered. The network may indicate a feedback of a MU-CQI by using two bits to indicate one of the PMI sets PSet1-PSet3. For example, the PMI sets PSet1-PSet3 may be indicated by bits "01", "10" and "11", respectively, and an event of no feedback is indicated by bits "00". The UE determines a MU-CQI set according to the PMI set PSet2, after receiving bits "10". In another example, only one PMI set PSet1 is considered. The network may indicate a feedback of a MU-CQI set by using only one bit to indicate the PMI set PSet1. For example, the PMI set PSet1 may be indicated by bit "1", and an event of no feedback is indicated by bit "0". The UE determines a MU-CQI set according to the PMI set PSet1, after receiving bit "1". Thus, overhead for transmitting the at least one PMI set is saved According to the above description and the process 40, performance (e.g., throughput) of the network and the UE is improved greatly, when the network operate the MU-MIMO according to the MU-CQI (s) reported by the UE. As a result, performance (e.g., capacity) of the wireless communication system 10 is improved.

Figure 6:
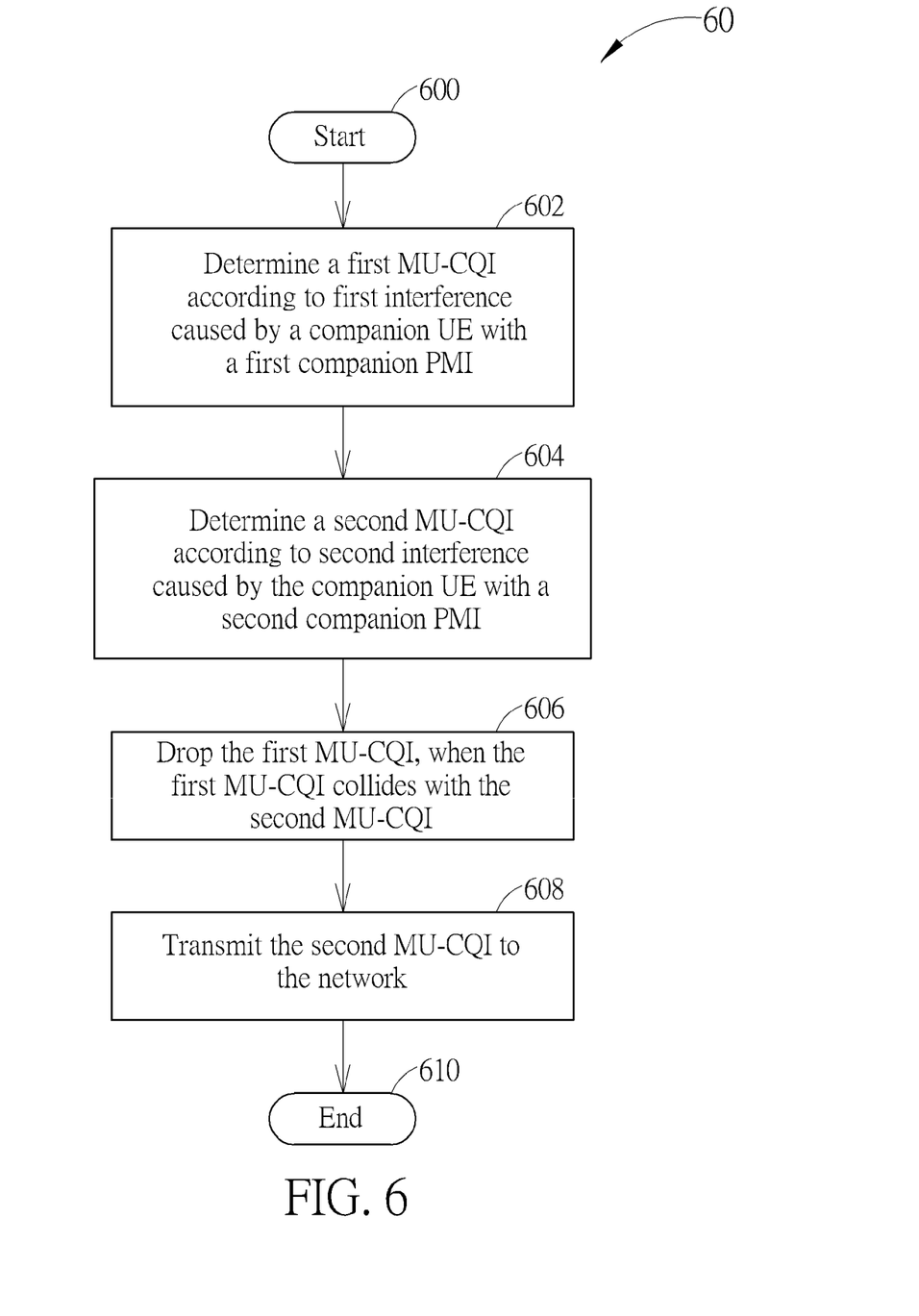
FIG. 6 is a flowchart of a process according to an example of the present invention.

Please refer to FIG. 6, which is a flowchart of a process 60 according to an example of the present invention. The process 60 can be utilized in a UE shown in FIG. 1, for handling MU-CQIs. The process 60 may be compiled into the program code 214 and includes the following steps:

Step 600: Start.

Step 602: Determine a first MU-CQI according to a companion UE.

Step 604: Determine a second MU-CQI according to a second companion PMI.

Step 606: Drop the first MU-CQI, when the first MU-CQI collides with the second MU-CQI.

Step 608: Transmit the second MU-CQI to the network.

Step 610: End.

According to the process 60, the UE determines a first MU-CQI according to a first companion PMI, and determines a second MU-CQI according to a second companion PMI. Then, the UE drops the first MU-CQI, when the first MU-CQI collides with the second MU-CQI, and transmits the second MU-CQI to the network. In addition, the UE may also transmit an indication to the network, when transmitting the second MU-CQI. For example, the indication may indicate the transmitted MU-CQI, i.e., the second MU-CQI. In another example, the indication may indicate the dropped MU-CQI, i.e., the first MU-CQI. Thus, collision between the MU-CQIs can be avoided, and the network can recognize the transmitted MU-CQI and the dropped MU-CQI according to the indication.

Realization of the process 60 is not limited is not limited to the above description. For example, the UE may determine that the first MU-CQI collides with the second MU-CQI, when the first MU-CQI and the second MU-CQI are scheduled to be transmitted via the same resource. In addition, a method according to which the UE selects the dropped MU-CQI is not limited. For example, the UE may compare a first orthogonality between a PMI of the UE and the first companion PMI and a second orthogonality between the PMI of the UE and the second companion PMI, when the first MU-CQI collides with the second MU-CQI. In general, more interference will be caused from a DL transmission to the UE, if the DL transmission is performed by the network using a companion PMI less orthogonal to the PMI of the UE to the companion UE. Please note that, the above description can be easily applied to a collision of two MU-CQI sets, e.g., by replacing the first MU-CQI and the first MU-CQI by the first MU-CQI set and the first MU-CQI set. The extension is straightforward, and is not narrated herein.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling one or more MU-CQIs for MU-MO. Thus, performance of the network and the UE is improved greatly, when the network operate the MU-MIMO according to the MU-CQI(s). As a result, performance of the wireless communication system is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling at least one multiuser channel quality indicator (MU-CQI) set for a communication device, the method being utilized in a communication device and comprising:
    being indicated at least one companion precoding matrix index (PMI) set by a network via receiving information of the at least one companion PMI set from the network, wherein the at least one companion PMI set is determined by the network rather than the communication device, and the information of the at least one companion PMI set is transmitted by the network;
    determining at least one MU-CQI set according to the at least one companion PMI set, respectively, wherein each MU-CQI of each MU-CQI set of the at least one MU-CQI set corresponds to each companion PMI of each companion PMI set of the at least one companion PMI set;
    receiving a plurality of PMI sets via a higher layer signaling transmitted by the network:
    selecting the at least one companion PMI set from the plurality of PMI sets according to the information: and
    transmitting the at least one MU-CQI set to the network aperiodically.

2. The method of claim 1, wherein the communication device transmits the at least one MU-CQI set via a physical uplink shared channel (PUSCH) to the network.

3. The method of claim 1, wherein the communication device transmits the at least one MU-CQI set in at least one time period indicated by the network to the network.

4. The method of claim 1, wherein the information comprises at least one bit indicating the at least one companion PMI set.

5. The method of claim 1, the instruction of transmitting the at least one MU-CQI set to the network comprises:
    transmitting a highest MU-CQI periodically to the network; and
    transmitting at least one MU-CQI of the at least one MU-CQI set aperiodically to the network according to a request transmitted by the network.

6. The method of claim 5, wherein the communication device transmits the highest MU-CQI periodically to the network via a physical uplink control channel (PUCCH).

7. The method of claim 5, wherein the communication device transmits the at least one MU-CQI to the network aperiodically via a physical uplink shared channel (PUSCH).

8. The method of claim 5, wherein least interference is caused to the communication device, when the network performs a downlink (DL) transmission to a companion device of the communication device according a PMI corresponding to the highest MU-CQI.

* * * * *